United States Patent
Lee et al.

(10) Patent No.: US 8,571,054 B2
(45) Date of Patent: Oct. 29, 2013

(54) TERMINAL DISTRIBUTION CONTROL FOR POINT-TO-MULTIPOINT SERVICE IN WIRELESS COMMUNICATION SYSTEM

(75) Inventors: Young Dae Lee, Kyoungki-do (KR); Sung-Duck Chun, Anyang (KR)

(73) Assignee: LG Electronics Inc., Seoul (KR)

( * ) Notice: Subject to any disclaimer, the term of this patent is extended or adjusted under 35 U.S.C. 154(b) by 397 days.

(21) Appl. No.: 12/496,554

(22) Filed: Jul. 1, 2009

(65) Prior Publication Data
US 2009/0264133 A1 Oct. 22, 2009

Related U.S. Application Data

(63) Continuation of application No. 11/208,093, filed on Aug. 19, 2005, now Pat. No. 7,953,034.

(60) Provisional application No. 60/603,373, filed on Aug. 19, 2004.

(30) Foreign Application Priority Data

Mar. 3, 2005 (KR) .......................... 10-2005-0017866

(51) Int. Cl.
- *H04J 3/26* (2006.01)
- *H04H 20/71* (2008.01)
- *H04B 7/00* (2006.01)
- *H04W 4/00* (2009.01)
- *H04L 12/28* (2006.01)
- *H04J 3/16* (2006.01)

(52) U.S. Cl.
USPC ........ 370/432; 370/312; 370/310.2; 370/328; 370/390; 370/437

(58) Field of Classification Search
None
See application file for complete search history.

(56) References Cited

U.S. PATENT DOCUMENTS

2004/0152473 A1 * 8/2004 Kuwano et al. ............ 455/456.2
2004/0202140 A1   10/2004 Kim et al.

(Continued)

FOREIGN PATENT DOCUMENTS

| JP | 2004233889 | 8/2004 |
| JP | 2005-041415 | 2/2005 |
| RU | 2113772 | 6/1998 |
| WO | 03/017713 | 2/2003 |

OTHER PUBLICATIONS

NTT DOCOMO: "Frequency dispersion after MBMS reception" 3GPP TSG-RAN WG2 Meeting #43, Aug. 16, 2004, pp. 1-2, XP002377181.*

(Continued)

*Primary Examiner* — Ayaz Sheikh
*Assistant Examiner* — Sori Aga
(74) *Attorney, Agent, or Firm* — Lee, Hong, Degerman, Kang & Waimey

(57) ABSTRACT

A method for controlling a user equipment (UE) capable of receiving a point-to-multipoint service in a wireless communication system comprises receiving a point-to-multipoint service and performing a cell reselection in response to completion of the receiving of the point-to-multipoint service. The cell reselection is performed among multiple frequencies. The cell reselection may be performed in response to signaling from the network. The cell reselection may be performed regardless of whether cell reselection criteria are satisfied. The cell reselection criteria may comprise at least one of a cell reselection reference value between frequencies and a cell reselection reference value within a frequency. The cell reselection criteria may be embodied in frequency layer dispersion (FLD) information. Alternatively, the cell reselection criteria may be embodied in frequency layer convergence (FLC) information.

4 Claims, 3 Drawing Sheets

(56) References Cited

U.S. PATENT DOCUMENTS

| | | | |
|---|---|---|---|
| 2004/0227618 A1* | 11/2004 | Hwang et al. ............ 340/7.46 |
| 2004/0228294 A1* | 11/2004 | Kim et al. ............... 370/312 |
| 2005/0041608 A1 | 2/2005 | Jeong et al. |
| 2005/0090278 A1* | 4/2005 | Jeong et al. ............. 455/525 |
| 2006/0039309 A1 | 2/2006 | Lee et al. |
| 2006/0154627 A1* | 7/2006 | Wang et al. ............. 455/130 |
| 2009/0264133 A1* | 10/2009 | Lee et al. ................ 455/436 |

OTHER PUBLICATIONS

LG Electronics; "Discussion on FLC and Cell Load"; 3GPP TSG-RAN WG2 Meeting #43; Aug. 16, 2004; R2-041538.

3 GPP Organizational Partners; 3rd Generation Partnership Project; Technical Specification group Radio Access network; Introduction of the Multimedia Broadcast Multicast Service (MBMS) in The Radio Access Network (RAN); Stage 2; Release 6; 3GPP TS 25.346; v6.0.0; (Mar. 2004).

NTT DOCOMO: "Frequency dispersion after MBMS reception," 3GPP TSG-RAN WG2 Meeting #43, R2-041616, Aug. 16, 2004.

3rd Generation Partnership Project (3GPP); "Technical Specification Group Radio Access Network; Introduction of the Multimedia Broadcast Multicast Service (MBMS) in the Radio Access Network (RAN); Stage 2 (Release 6)"; 3GPP TS 25.346 V6.1.0; Jun. 2004.

* cited by examiner

TERMINAL DISTRIBUTION CONTROL FOR POINT-TO-MULTIPOINT SERVICE IN WIRELESS COMMUNICATION SYSTEM

CROSS-REFERENCE TO RELATED APPLICATIONS

This application is a continuation of U.S. application Ser. No. 11/208,093 filed on Aug. 19, 2005 (now U.S. Pat. No. 7,953,034), which pursuant to 35 U.S.C. §119(a) and (e), claims the benefit of earlier filing date and right of priority to Provisional Application No. 60/603,373, filed on Aug. 19, 2004 and Korean Application No. 2005-0017866, filed on Mar. 3, 2005, the contents of which are hereby incorporated by reference herein in their entirety.

FIELD OF THE INVENTION

The present invention relates generally to point-to-multipoint service in a wireless communication system and, more particularly, to terminal distribution control for point-to-multipoint service.

BACKGROUND OF THE INVENTION

The UMTS (universal mobile telecommunications system) is a third generation mobile communications system evolved from the European GSM (Global System for Mobile Communications) system and aims to provide improved mobile communication services based on a GSM core network and a wideband code division multiple access (W-CDMA) technology.

FIG. 1 is a block diagram illustrating a structure of a UMTS network.

Referring to FIG. 1, the UMTS system generally consists of a terminal (e.g., user equipment (UE)), a UTRAN (UTMS radio access network) and a CN (core network). The UTRAN includes one or more RNSs (radio network sub-systems). Each RNS includes a single RNC (radio network controller) and one or more base stations (e.g., node-Bs) managed by the RNC. Each Node B managed by the RNC receives information sent from a physical layer of a terminal on the uplink, and transmits data to the terminal on the downlink. Thus, the node-B serves as an access point to the UTRAN for the terminal. The RNC allocates and manages radio resources, and serves as an access point to the CN for the UTRAN.

FIG. 2 is a diagram illustrating a connection structure between a UTRAN and a terminal in a UMTS network. As such, FIG. 2 shows an exemplary architecture of radio interface protocols between a terminal and a UTRAN based on a 3GPP radio access network specification.

Referring to FIG. 2, the radio protocol is horizontally arranged to include a physical layer, a data link layer and a network layer. The radio protocol is vertically divided into a user plane for transmitting data information and a control plane for transferring control signals. Furthermore, the protocol layers shown in FIG. 2 may be divided into a first layer L1, a second layer L2 and a third layer L3, based upon the three lower layers of an open system interconnection (OSI) specification model that is well-known in the art of communications systems.

The first layer L1 (e.g., the physical layer) uses physical channels to provide information transfer service to its upper layers. The physical layer is connected via a transport channel to a medium access control (MAC) layer located at an upper layer thereof. Data between the medium access control layer and the physical layer is transferred via this transport channel. Furthermore, the data between different physical layers, i.e. between physical layers of transmitting side and receiving side, is transferred via the physical layer.

The MAC layer of the second layer L2 provides services to an upper radio link control (RLC) layer via a logical channel. The RLC layer of the L2 supports reliable data transmissions and performs segmentation and concatenation of RLC SDUs (service data units).

The RRC (Radio Resource Control) layer positioned in the lowest portion of the third layer (L3) is defined in the control plane and controls the transport channels and the physical channels for establishment, reconfiguration, and release of radio bearers (RBs). The RB indicates a service by the L2 for a data transfer between the terminal and the UTRAN. In general, establishing the RB denotes processes of stipulating the characteristics of a protocol layer and a channel, which are required for providing a specific service, and setting corresponding parameters and operation methods.

When the RRC layer of a specific terminal and the RRC layer of the UTRAN are connected to each other to exchange RRC messages, the corresponding terminal is in a RRC connected state. On the contrary, when not connected to each other, the corresponding terminal is in an idle state. The terminal in the RRC connected state is further divided into URA_PCH state and CELL_PCH state, CELL_FACH state and CELL_DCH state. Terminals in the idle state or the URA_PCH state and CELL_PCH state use a discontinuous reception (DRX) method to reduce power consumption, thereby discontinuously receiving a physical channel (i.e., SCCPCH (secondary common control physical channel)) to which a physical channel (i.e., PICH (paging indicator channel)) and a transport channel (i.e., PCH (paging channel)) are mapped. The terminal is in a sleeping mode during the remaining time periods excluding those times when receiving the PICH or the SCCPCH. The terminal performing the DRX method wakes up once per DRX cycle length to receive a PI (paging indicator) of the PICH channel.

The terminal in the RRC connected state may further have a signaling connection with the CN. In this case, the signaling connection indicates a path for exchanging control messages between the terminal and the CN. The RRC connected state denotes a connection between the terminal the UTRAN, while the signaling connection denotes a connection between the terminal and the CN. The terminal uses the signaling connection to inform the CN of its position and/or to request services. The terminal should be in the RRC connected state to have a signaling connection.

A MBMS (multimedia broadcast/multicast service) is described below.

The MBMS refers to a service for providing streaming or background services to a plurality of terminals using a downlink dedicated MBMS bearer service. In the UTRAN, the MBMS bearer uses a point-to-multipoint radio bearer (RB) and a point-to-point RB. At this time, the point-to-multipoint RB uses a common channel (e.g., using the SCCPCH as a physical layer) so that a plurality of terminals subscribed to a corresponding service may receive the service.

The MBMS is divided into a broadcast mode and a multicast mode. The MBMS broadcast mode is a service for transmitting multimedia data to all users within a broadcast area. Conversely, the MBMS multicast mode is a service for transmitting the multimedia data only to a specific user group within a multicast area. The broadcast area refers to a region in which it is possible to transmit the broadcast service, and the multicast area refers to a region in which it is possible to transmit the multicast service.

FIG. 3 is a diagram illustrating an example of the UMTS network providing a point-to-multipoint service to the terminal.

Referring to FIG. 3, a UE1 performs a subscribing process in order to receive an MBMS service. The UE1 also receives a service announcement provided by the network regarding the MBMS service. Subscribing refers to the establishment of a relationship between a service provider and a user. A service announcement refers to providing the terminal an index and other information related to the services to be provided. For example, a terminal that desires to receive the MBMS service of a multicast mode should join a multicast group. The multicast group refers to a group of terminals receiving a specific multicast service. Joining refers to a user merging with other users in a multicast group to receive a particular multicast service. The terminal may inform the UMTS network that it desires to receive specific multicast data through MBMS multicast joining. On the contrary, leaving is a procedure in which a terminal that joined a specific multicast group releases its joining to the multicast group. Each terminal performs such subscribing, joining and leaving processes. The terminal may perform the subscribing, joining, and leaving processes any time of before, during, or after data transmission.

During performance of a specific MBMS service, one or more sessions may sequentially be generated with respect to the MBMS service. If data to be transmitted for the specific MBMS service is generated in a MBMS service source, the CN notifies a session start to the RNC. However, if there is no data to be transmitted for the specific MBMS service in the MBMS service source, the CN notifies a session end to the RNC. The data transmission with respect to the specific MBMS service may be carried out between the session start and the session end. At this time, the data transmitted through the data transmission process is transmitted only to terminals that have joined the multicast group.

In the session start process, the UTRAN receives the session start notification from the CN and transfers a MBMS notification to the terminals. The MBMS notification refers to the UTRAN informing a terminal that the data transmission of the specific MBMS service in a cell is imminent. The MBMS notification may be transmitted multiple times before the transmission of the data pertaining to the service. When carrying out the MBMS notification process, the UTRAN may also count the number of terminals receiving the specific MBMS service within a cell. The counting may be used for determining whether a point-to-multipoint RB or a point-to-point RB is set as the RB for transmitting the specific MBMS service data, or whether no RB is set.

The UTRAN internally establishes a threshold value to select an appropriate MBMS RB. After the UTRAN counts the number of terminals, if the counted number of terminals receiving the corresponding MBMS service within the corresponding cell is smaller than the threshold value, the UTRAN establishes a point-to-point RB. However, a point-to-multipoint RB is established if the counted number of terminals is greater than the threshold value. After determining the MBMS RB, the UTRAN informs the terminals of the establishment information of the corresponding RB.

When the point-to-point RB is established for the specific service, the terminals that desire to receive the service must be in the RRC connected mode state. However, when the point-to-multipoint RB is established for the specific service, the terminals that desire to receive the service do not have to be in the RRC connected mode state. That is, terminals in an idle state may also receive the MBMS service data by using the point-to-multipoint RB. However, if no terminals are counted, the UTRAN does not establish any RB and does not transmit the MBMS service data. As such, the UTRAN establishing an RB when there is no user who wants to receive the service may cause undesirable consumption of radio resources. The UTRAN initiates a transmission for MBMS service data received from the CN during a session using the determined RB.

During the counting process, the UTRAN does not have any information pertaining to terminals in an RRC idle mode. Accordingly, when the terminals in the RRC idle mode are requested by the UTRAN for counting (with respect to MBMS services subscribed by the terminals), the terminals in the RRC idle mode implement an RRC connection with the UTRAN. As a result, the terminals notify the UTRAN that the terminals in the RRC idle mode want to receive the specific MBMS service.

However, when the terminals have a signaling connection with the SGSN (serving general packet radio service support node), the SGSN informs the UTRAN of information related to the MBMS of the terminals. The information includes a list of MBMS services subscribed to by the terminals. Therefore, the UTRAN may recognize whether the terminals have subscribed to a specific MBMS service. Accordingly, the terminals do not respond to the request for the counting from the UTRAN. Terminals which do not have the signaling connection with the SGSN but are in the RRC connected state may inform the UTRAN of the list of MBMS services subscribed to by the terminals. Hence, the UTRAN may recognize the number of terminals desiring to receive the specific MBMS service without receiving any response from the terminals in the RRC connected state.

The UTRAN may perform the counting process during a session of the MBMS service or in the initial step of the MBMS service. This is because, during the MBMS session, the terminal may move into another cell, turn off its power, or discontinue use of the MBMS service. Therefore, the number of terminals desiring to receive the MBMS service in a cell may change. Thus, the UTRAN may perform the counting process to establish the RB more efficiently even while the MBMS session is ongoing.

A FLC (Frequency Layer Convergence) is described below.

In the UMTS system, a base station may actually use one or more frequency bandwidths. That is, because all users may not receive services with appropriate qualities using only one frequency bandwidth in an area where many users are congregated (e.g., in a hot-spot), service providers consider the service demand in a region where the base station is positioned in order to provide services by using more than one frequency bandwidth.

When one base station uses several frequencies, for example several adjacent frequencies, the propagation characteristics of radio waves in each frequency have many similarities. If one MBMS service is provided using a power level corresponding to approximately ten percent of the entire power available for a specific frequency in a specific cell, when the base station provides the same MBMS service at other frequencies, significant radio resources may be consumed.

Therefore, when a base station uses several frequencies, the base station selects one frequency among the available frequencies to provide the MBMS service. The terminals then move to the selected frequency. The preceding operations are referred to as FLC (Frequency Layer Convergence). The specific frequency selected by the base station to provide the MBMS service is referred to as a preferred frequency.

In FLC, when notifying terminals of a MBMS start, the base station informs the terminals of the preferred frequency on which the MBMS service is provided to induce the terminals to move to the specific frequency. To this end, the base station informs the terminals positioned at frequencies other than the preferred frequency that the MBMS service is provided only at the preferred frequency. Then, the terminals carry out a cell reselection procedure. When a condition for changing a cell is satisfied, the terminals reselect a cell to move to the preferred frequency.

The cell reselection by the terminals is described below.

The cell reselection process is a process for positioning a terminal in a cell that provides services of at least a minimum quality. In this process, the terminal compares the quality of a serving cell against the quality of a neighboring cell. If the quality of the neighboring cell is superior to that of the serving cell, the terminal reestablishes the neighboring cell as its serving cell.

Cell quality may be influenced by radio wave environment, which may change in an irregular manner. As a result, a terminal located at a boundary of more than two cells frequently performs cell reselection in an alternating fashion (e.g., selecting different cells in turn). Whenever cell reselection is performed, the terminal must re-register its location with a new cell or temporarily stop data transmissions. Accordingly, cell reselection should not be performed more frequently than necessary, to prevent waste of resources. Accordingly, when the quality of the serving cell is higher than a specific reference value, the terminal does not perform cell reselection. The specific reference value is set at a value by which services may be provided at a satisfactory level to the terminal. That is, even if the serving cell does not provide better quality than neighboring cells, if the quality of the serving cell is higher than the specific reference, then the terminal does not perform cell reselection.

When a base station uses several frequencies, each frequency may be for a particular cell, and the cell reselection is used in Cell_PCH, Cell_FACH, URA_PCH and idle mode in which the UTRAN does not assign a cell where the terminal should be positioned.

FLC is described in relationship with cell reselection, below. When a frequency in a cell in which a terminal is positioned is not a preferred frequency, the terminal receives information regarding the preferred frequency from a base station at an initial step of the MBMS service. However, as described above, if the quality of the cell in which the terminal is positioned exceeds a specific reference value, the terminal does not perform the cell reselection process. Because the MBMS service subscribed by the terminal is provided only at the preferred frequency, if the terminal does not move to the preferred frequency, the terminal may not receive the service to which it subscribed. Therefore, in order for the terminal to receive the service to which it has subscribed, when a specific MBMS service is provided only at a preferred frequency and the terminal does not position itself at the preferred frequency, the terminal performs the cell reselection process even if the quality of the serving cell where the terminal is positioned is higher than the specific reference value.

In the cell reselection process, the base station informs the terminal of an offset value to facilitate the selection of the preferred frequency by the terminal. The offset value is added to a quality measurement value of a cell positioned at the preferred frequency or is excluded from a quality measurement value of a cell not positioned at the preferred frequency. A specific frequency or a specific cell is determined to have a quality better than that of other cells based on this offset value. Accordingly, the base station may increase the probability that the terminal moves to the preferred frequency or the specific cell.

As mentioned above, the FLC is a method for positioning a plurality of terminals at a specific frequency bandwidth in a certain area. That is, using this FLC method, the base station may reduce consumption of radio resources to provide the MBMS service to the terminals.

However, the FLC deliberately changes a distribution of terminals in order to position many terminals at a preferred frequency. As a result, many terminals are positioned at the preferred frequency, but a relatively small number of terminals are positioned at other frequencies. Therefore, a load is converged only upon a specific cell, causing an imbalance between the frequencies and cells. In addition, as compared to a uniform distribution of terminals over several cells, when FLC is implemented, the terminals may receive services of lesser quality, resulting in an inefficient allocation of radio resources.

As described above, at the initial step of the MBMS service, the terminal performs the cell reselection process to move into the cell of the preferred frequency on the basis of information transmitted from the base station even if the quality of the serving cell in which the terminal is positioned exceeds a certain reference value. However, after completing the MBMS service, when the quality of the cell in which the terminal is positioned exceeds the specific reference value, the terminal does not move into a new cell but remains positioned at the preferred frequency. That is, the state of the MBMS service start, i.e. that terminals positioned at other frequencies are converged upon the preferred frequency, continues until after the MBMS service is completed. A problem may occur, however, in which the number of terminals to which a cell may provide services with the appropriate quality is exceeded. This problem may continue even after the MBMS service has ended.

In general, if the terminal is positioned in a cell with the best quality, much data may be exchanged with the base station even with relatively low power. However, depending on the current FLC method of the MBMS service, although the terminal may receive a service with far better quality from another frequency or cell after the MBMS service is completed, the terminal does not change the frequency. Instead, the terminal remains continuously positioned at the same frequency as long as the quality of the currently selected cell is higher than a certain reference value. This distribution of terminals after the MBMS service is completed may waste power in terminals.

SUMMARY OF THE INVENTION

Accordingly, the present invention is directed to terminal distribution control for point-to-multipoint service that substantially obviates one or more problems due to limitations and disadvantages of the related art.

An object of the present invention is to provide uniform distribution of terminals that were converged upon a specific preferred frequency due to FLC (Frequency Layer Convergence), over several frequencies upon point-to-multipoint service completion.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method for controlling a user equipment (UE) capable of receiving a point-to-multipoint service in a wireless communication system comprises receiving a point-to-multipoint service and performing a cell reselection in response to completion of the receiving of the point-to-multipoint service. The cell reselection is performed among multiple frequencies.

The cell reselection may be performed in response to signaling from the network. The cell reselection may be performed regardless of whether cell reselection criteria are satisfied. The cell reselection criteria may comprise at least one of a cell reselection reference value between frequencies and a cell reselection reference value within a frequency.

The cell reselection criteria may be embodied in frequency layer dispersion (FLD) information. Alternatively, the cell reselection criteria may be embodied in frequency layer convergence (FLC) information.

The point-to-multipoint service may be a multimedia service. The point-to-multipoint service may be received from a UTMS terrestrial radio network (UTRAN). The cell reselection may be performed among available frequencies.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Figure 1:
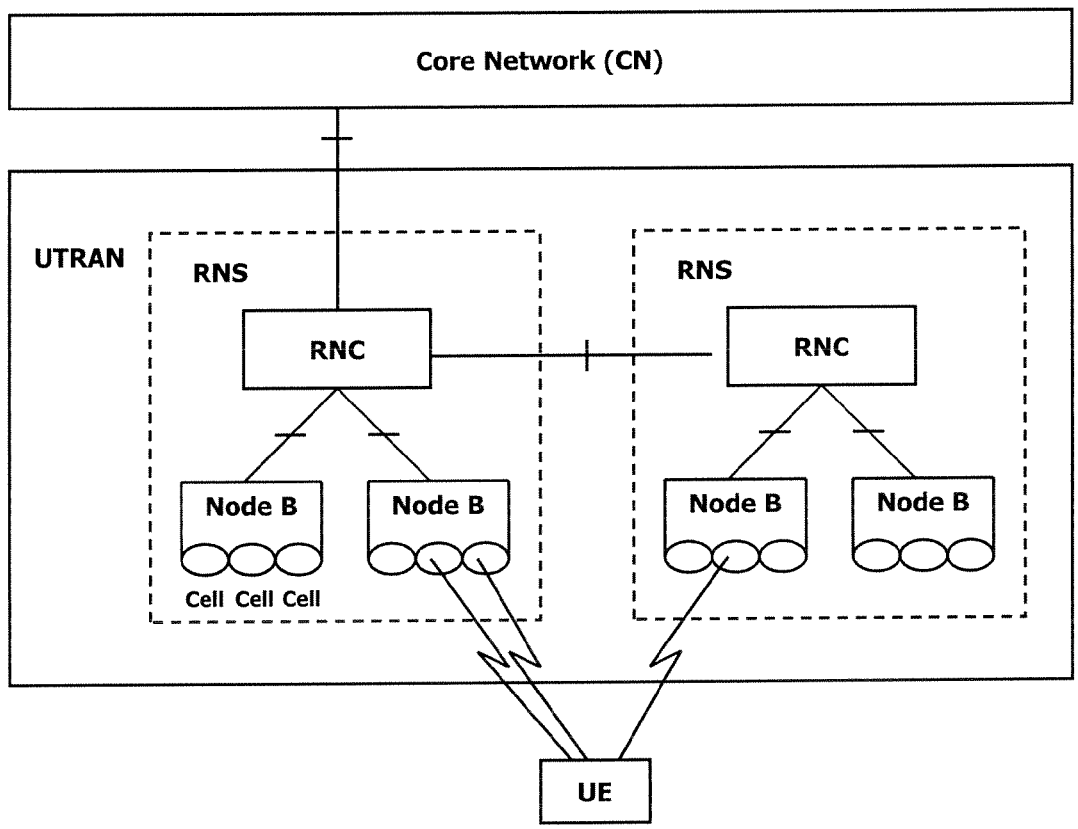
FIG. 1 is a block diagram illustrating a structure of a UMTS network.
Figure 2:
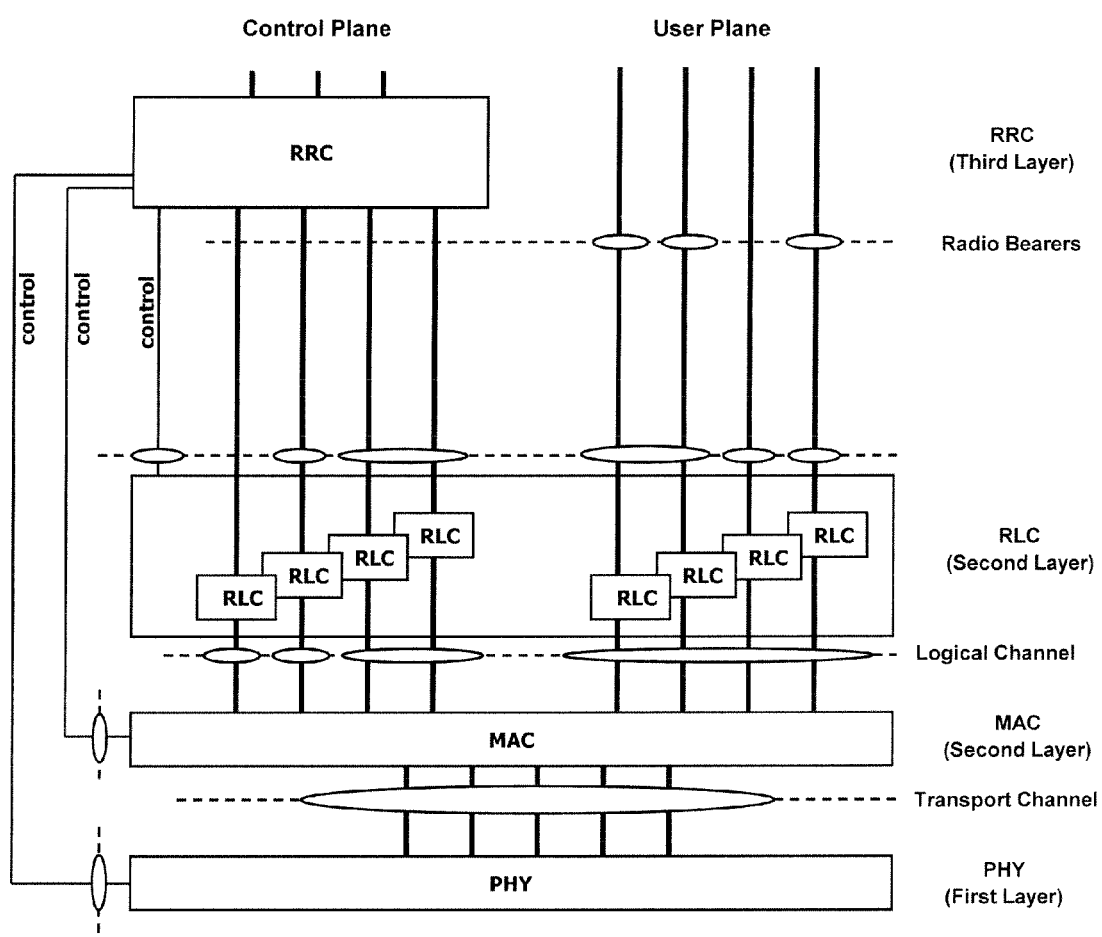
FIG. 2 is a diagram illustrating a connection structure between a UTRAN and a terminal in a UMTS network.
Figure 3:
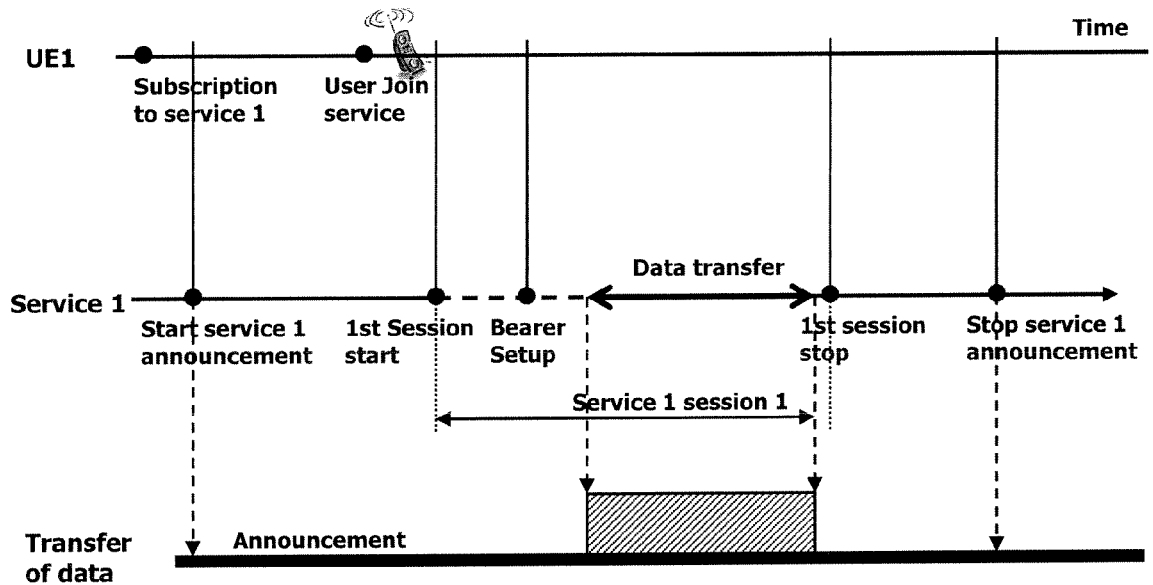
FIG. 3 is a diagram illustrating an example of the UMTS network providing a point-to-multipoint service to the terminal.

Reference will now be made in detail to the preferred embodiments of the present invention, examples of which are illustrated in the accompanying drawings. Wherever possible, the same reference numbers will be used throughout the drawings to refer to the same or like parts.

The present invention may be embodied in a mobile communications system such as the UMTS (Universal Mobile Telecommunications System) developed by the 3GPP. However, the present invention may also be applied to communications systems operated using other specifications. Furthermore, the point-to-multipoint service referred to herein may be a multimedia broadcast/multicast service (MBMS) or other type of service. Additionally, the terminal referred to herein may be a user equipment (UE) or other type of terminal.

Using the present invention, a UTRAN may utilize and share resources more efficiently. Furthermore, a terminal may receive services in a cell more efficiently and with better quality. In one embodiment, a terminal moving into a preferred frequency by FLC (Frequency Layer Convergence) performs cell reselection and moves to a frequency with a relatively better quality, after a corresponding MBMS service is completed. That is, when the MBMS service is completed, the terminal is notified of the completion of the MBMS service by the base station and performs a cell reselection process. In the cell reselection process, the terminal searches available frequencies as candidate frequencies. The completion of an MBMS service is also known as the end of an MBMS session.

Furthermore, when the MBMS service is completed, the base station may uniformly distribute many terminals converged upon a preferred frequency over several frequencies. The base station may recognize the load generated in each cell at each frequency. Therefore, the base station may regulate FLC information to congregate multiple terminals on a specific frequency bandwidth. The specific frequency bandwidth that the multiple terminals are converged upon by the base station is the preferred frequency. Alternatively, the base station may instruct the multiple terminals to be distributed over several frequency bandwidths.

The FLC information may include details regarding the frequencies that each MBMS is being transmitted. The FLC information may also include details regarding measuring parameters, measurement compensated values, or offsets to be applied to cells when the terminal performs cell reselection. Furthermore, the FLC information may include a basis for determining a cell change, or instructions regarding whether the cell reselection should be performed with respect to various frequencies.

When the base station provides the MBMS service, if the number of terminals converged on the preferred frequency is not high enough to cause problems in providing other services, or if the terminals have already been converged to maximum capacity on another frequency and additional terminals may not be converged on the another frequency, the base station does not instruct the terminals to perform cell reselection, even if the MBMS service is completed. However, when the base station is required to distribute terminals converged on the preferred frequency over several frequencies, the base station may instruct the terminal to perform cell reselection, even though the quality of a preferred frequency in a cell at which the terminal is currently positioned is greater than a cell reselection reference value.

Figure 4:
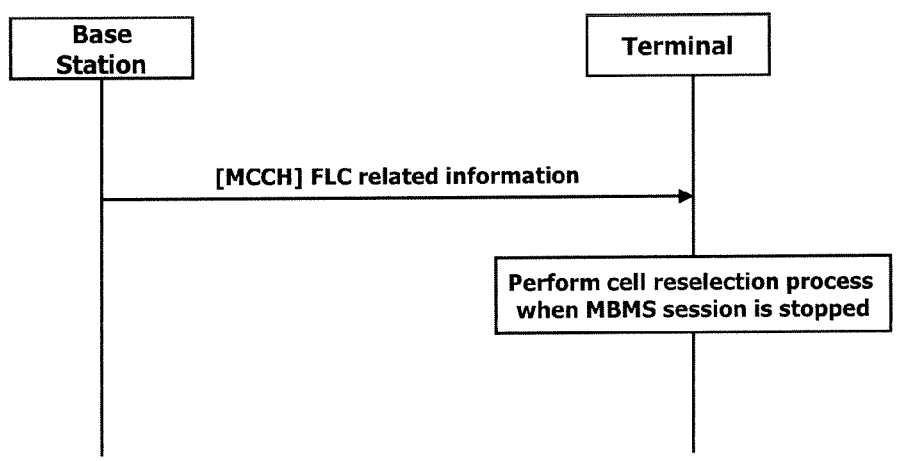
FIG. 4 is a diagram illustrating terminal distribution control for a point-to-multipoint service, according to an embodiment of the present invention.

FIG. 4 is a diagram illustrating terminal distribution control for a point-to-multipoint service, according to an embodiment of the present invention.

Referring to FIG. 4, the base station transmits FLC information and the terminals move to the preferred frequency based on the FLC information. The terminals then receive the MBMS service. When the MBMS service is completed, the terminals may perform cell reselection by measuring the qualities of available frequencies and selecting a frequency in a cell having the best quality. The selected frequency may be in the current serving cell or another cell. If the terminal selects a frequency in another cell, the another cell is designated as the serving cell. The selection of a new serving cell may occur regardless of whether the quality of the new serving cell is higher than the cell reselection reference value. The cell reselection reference value may preferably be a cell reselection reference value between frequencies (Sintersearch) or a cell reselection reference value within a frequency (Sintrasearch).

After the MBMS session ends, the terminal may perform cell reselection regardless of the cell reselection reference value until the terminal measures qualities of several frequencies in order to select a frequency to be positioned. The terminal then moves to the selected frequency. Furthermore, cell reselection may be performed when the quality value of the serving cell is less than a specific reference value.

During reception of the MBMS service by the terminal, when FLC information (e.g., information regarding a preferred frequency) is changed, when FLC information is not being transmitted from the base station, or when the base station notifies the terminal that the FLC is not being used, the terminal may perform cell reselection regardless of the cell reselection reference value with respect to available frequencies. Available frequencies are frequencies adjacent to the serving cell where the terminal is positioned.

Furthermore, in another embodiment, a plurality of frequencies may be established as the preferred frequency. In such case, service quality may be maintained despite convergence. To this end, the base station may assign a plurality of frequencies as the preferred frequency and inform the terminal through a MCCH (MBMS Control Channel). Upon receiving the notification from the base station that more than one frequency is assigned as the preferred frequency, the terminal adds an offset value, which may be provided by the base station, to the preferred frequency to perform cell reselection.

In cell reselection, if a plurality of preferred frequencies are related to a specific MBMS service transmitted from the base station, the terminal may select an arbitrary frequency and then select a cell that has the arbitrary frequency bandwidth as its serving cell. Furthermore, if a plurality of preferred frequencies related to the specific MBMS service are transmitted from the base station, the terminal may measure the quality of the cell of the preferred frequency bandwidth to select a frequency bandwidth with an optimal quality and set the cell of the corresponding frequency bandwidth as its serving cell.

Furthermore, in cell reselection, when the number of preferred frequencies related to the specific MBMS service received from the base station is changed, the terminal measures each frequency bandwidth to select an arbitrary bandwidth and then moves to the corresponding frequency bandwidth. Additionally, during cell reselection, when the number of preferred frequencies related to the specific MBMS service received from the base station is changed, the terminal measures each frequency bandwidth to select a frequency bandwidth which provides the best quality and then moves into the corresponding frequency bandwidth. Also, in the cell reselection process, when the FLC information transmitted from the base station to the terminal does not include the information related to the preferred frequency, the terminal performs the cell reselection process by searching available frequencies as candidate frequencies.

However, once the MBMS service is completed, when the cell reselection process is required to search several frequencies as candidate frequencies, measurement of the qualities with respect to available frequencies by the terminal in order to determine a cell to be positioned may require a significant time period. This time period for measurement may result in an increase in service disconnection time for the terminal. Therefore, after the MBMS service is completed, when the terminal performs cell reselection by searching various frequencies as candidate frequencies, the terminal may not measure all frequencies. Rather, the terminal may select an arbitrary frequency among the available frequencies, and move to the cell of the arbitrary frequency.

In one embodiment, a method for controlling a user equipment (UE) capable of receiving a point-to-multipoint service in a wireless communication system comprises receiving a point-to-multipoint service and performing a cell reselection in response to completion of the receiving of the point-to-multipoint service. The cell reselection is performed among multiple frequencies.

The cell reselection may be performed in response to signaling from the network. The cell reselection may be performed regardless of whether cell reselection criteria are satisfied. The cell reselection criteria may comprise at least one of a cell reselection reference value between frequencies and a cell reselection reference value within a frequency.

The cell reselection criteria may be embodied in frequency layer dispersion (FLD) information. Alternatively, the cell reselection criteria may be embodied in frequency layer convergence (FLC) information.

The point-to-multipoint service may be a multimedia service. The point-to-multipoint service may be received from a UTMS terrestrial radio network (UTRAN). The cell reselection may be performed among available frequencies.

The present invention may provide for, after an MBMS service is completed, the terminal may perform cell reselection. Accordingly, the terminal may move into a cell in which a service is provided with an optimal quality. Therefore, load may be minimized from being converged upon a specific cell.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A method for controlling a user equipment (UE) configured to receive a point-to-multipoint service in a wireless communication system, the method performed by the UE and comprising:
   receiving the point-to-multipoint service;
   completing the reception of the point-to-multipoint service by releasing a point-to-multipoint radio bearer; and
   performing a cell reselection based on control information received from a base station after the completion of the reception of the point-to-multipoint service,
   wherein the control information includes a first parameter associated with measurement between frequencies and a second parameter associated with measurement within a frequency,
   wherein performing the cell reselection comprises:
      selecting a frequency randomly from among a plurality of frequencies using the control information; and
      selecting a suitable cell within the selected frequency,
   wherein the point-to-multipoint service is received based on a frequency indicated by the control information,
   wherein the cell reselection is performed when the UE decides to no longer receive the point-to-multipoint service,
   wherein the cell reselection is performed among multiple frequencies without measuring all candidate frequencies,
   wherein the control information further includes frequency layer convergence (FLC) information, wherein the FLC information indicates at least one preferred frequency, wherein the FLC information includes an offset to be applied to the at least one preferred frequency, and wherein the offset is added to a quality measurement value of a cell positioned at the preferred frequency for comparing the cell with another cell during the cell reselection.

2. A user equipment (UE) for receiving a point-to-multipoint service in a wireless communication system, the UE comprising:

means for receiving the point-to-multipoint service;

means for completing the reception of the point-to-multipoint service by releasing a point-to-multipoint radio bearer; and means for performing a cell reselection based on control information received from a base station after the completion of the reception of the point-to-multipoint service, wherein the control information includes a first parameter associated with measurement between frequencies and a second parameter associated with measurement within a frequency, wherein the means for performing the cell reselection performs the cell reselection by:

selecting a frequency randomly from among a plurality of frequencies using the control information; and selecting a suitable cell within the selected frequency, wherein the point-to-multipoint service is received based on a frequency indicated by the control information, wherein the cell reselection is performed when the UE decides to no longer receive the point-to-multipoint service, wherein the cell reselection is performed among multiple frequencies without measuring all candidate frequencies, wherein the control information further includes frequency layer convergence (FLC) information, wherein the FLC information indicates at least one preferred frequency, wherein the FLC information includes an offset to be applied to the at least one preferred frequency, and wherein the offset is added to a quality measurement value of a cell positioned at the preferred frequency for comparing the cell with another cell during the cell reselection.

3. The method of claim 1, wherein the cell reselection is performed if a variable related to previous frequency information for the point-to-multipoint service is not empty.

4. The UE of claim 2, wherein the cell reselection is performed if a variable related to previous frequency information for the point-to-multipoint service is not empty.

* * * * *